United States Patent [19]

Baird et al.

[11] Patent Number: 4,563,366

[45] Date of Patent: * Jan. 7, 1986

[54] NON-HEATED GELLAN GUM GELS

[75] Inventors: John K. Baird; Jaewon L. Shim, both of San Diego, Calif.

[73] Assignee: Merck & Co., Inc., Rahway, N.J.

[ * ] Notice: The portion of the term of this patent subsequent to Mar. 5, 2002 has been disclaimed.

[21] Appl. No.: 682,516

[22] Filed: Dec. 17, 1984

Related U.S. Application Data

[62] Division of Ser. No. 499,594, May 31, 1983, Pat. No. 4,503,084.

[51] Int. Cl.$^4$ .......................... A23L 1/04; A23C 9/154
[52] U.S. Cl. .................................... 426/573; 426/271; 426/574
[58] Field of Search ................ 426/573, 575, 658, 271

[56] References Cited

U.S. PATENT DOCUMENTS

| | | | |
|---|---|---|---|
| 4,219,583 | 8/1980 | Igoe | 426/573 |
| 4,326,052 | 4/1982 | Kang et al. | 426/573 |
| 4,326,053 | 4/1982 | Kang et al. | 426/573 |
| 4,436,759 | 3/1984 | Trilling et al. | 426/575 |
| 4,503,084 | 3/1985 | Baird et al. | 426/573 |

OTHER PUBLICATIONS

R. H. McDowell, Properties of Alginates 4th Ed., p. 15, 1977.

*Primary Examiner*—Jeanette M. Hunter
*Attorney, Agent, or Firm*—Gabriel Lopez; Hesna J. Pfeiffer

[57] ABSTRACT

Gellan gum food gels are formed without first going through a heating and cooling cycle.

5 Claims, No Drawings

NON-HEATED GELLAN GUM GELS

This is a division of application Ser. No. 499,594, filed May 31, 1983, now U.S. Pat. No. 4,503,084.

BACKGROUND OF THE INVENTION

Native S-60 and its deacetylated forms are described in U.S. Pat. Nos. 4,326,052 and 4,326,053. S-60, native, clarified, and non-clarified, form thermoreversible gels upon heating and subsequent cooling. Deacetylated S-60 is also characterized in that it exhibits reduced solubility in salt solutions. The heating requirement is undesirable in certain systems; i.e., it would be preferable in systems where heat would adversely affect certain components to be able to produce an S-60 gel at ambient temperature.

SUMMARY OF THE INVENTION

It has now been found that S-60 solutions will form gels by reaction with mono-, di- or polyvalent cations or combinations thereof without first heating them to 90° C. Further, it has been found that the use of a sequestrant facilitates the dissolution of S-60, especially the deacetylated and partially deacetylated forms thereof in salt-containing solutions.

DETAILED DESCRIPTION OF THE INVENTION

Heteropolysaccharide S-60 shall be referred to herein as gellan gum; the clarified forms thereof as clarified gellan gum; etc. Thus, the gums will be referred to as native, deacetylated, deacetylated clarified, partially deacetylated, and partially deacetylated clarified gellan gum. Partially deacetylated gellan gum refers to gellan gum having less than 100% but greater than 0% acetyl content compared to native gellan gum.

It will be understood by those skilled in the art that reference herein to gum gels shall mean gels of aqueous systems containing an effective amount of the gum and water, optionally with additional materials such as sugars, fats, hydrocolloids, proteins, coloring and flavoring agents, and additional organic or inorganic solvents, including glycols.

The sequestrants which can be used in this invention include trisodium orthophosphate (TSP), ethylenediaminetetraacetic acid (EDTA), sodium citrate, tetrasodium pyrophosphate (TSPP), sodium hexametaphosphate (Calgon) and the like.

The sequestrants can be added to the aqueous media before or after introduction of the gum. Alternatively, they can be added concomitantly, for example, by preparing dry blends of gum and sequestrant.

The amount of sequestrant required to completely dissolve the gum at ambient temperature is a function of the amount of gum, the number of free polyvalent cations in solution, and the particular sequestrant used. The amount of gellan gum which can be used for forming gels ranges from about 0.05–3% (wt./wt.). For many applications levels of 0.05–1% (wt./wt.) are recommended. The gums can be used singly or in combination depending on the properties of the gel which are desired.

Gelation is accomplished by introducing free mono-, di- or polyvalent cations in the gellan gum solution. The solution can be in tap water, deionized water, or other aqueous media containing salts or other components such as colorants, flavoring agents, active ingredients such as deodorants, foods, preservatives, etc. The preferred ions are those of Groups I, II and III of the Periodic Table, especially $Na^+$, $K^+$, $Ca^{++}$, $Mg^{++}$, and $Al^{+++}$. $H^+$ can be suitably used. $Ca^{++}$ and $Mg^{++}$ are especially preferred. An amount in excess of that captured by the sequestrant must be used to effect gelation. This excess amount can either be added to the solution or can be released within the solution. Introduction of the ions can be effected by allowing the ions to diffuse into a gellan gum solution or by release of the ions within the gellan gum solution from particles of an appropriate salt containing the ion, e.g., calcium sulfate, calcium lactate, calcium phosphate, calcium carbonate, calcium gluconate, calcium tartrate, calcium chloride, sodium chloride and magnesium sulfate. The former technique is sometimes referred to as diffusion setting; the latter as internal or bulk setting. Bulk setting normally requires the use of a sequestrant to control the release of ions during mixing in order to prevent premature gel formation. Typical of the sequestrants which can be used are TSP, EDTA, TSPP, citrate, and Calgon.

When the gel is to be prepared by bulk setting, a dry mix can be prepared comprising gellan gum, a setting salt and a sequestrant. The sequestrant in such a mix functions both to remove interfering ions from the aqueous system so as to allow dissolution of the gum at ambient temperature and also to control release of the gelling ions from the salt.

At no time in the process of the invention is the temperature of the gellan gum solution elevated above 70° C., either during the dissolution or gelation steps; i.e., the process is operative in the range 0°–70° C., preferably between ambient and 40° C.

Gellan gum, reacted as described above, can be used to provide a range of useful gelled industrial (such as deodorant gels) and food products. Typical gelled food products include fabricated vegetables, fruits, meat and fish, aspics, petfoods, water and milk based desserts, syrups and toppings. These gelled products are generally made by preparing an aqueous composition of the food ingredients and dissolved gellan gum. Gellation is effected by reacting the dissolved gum with an acceptable cation from Groups I, II or III of the Periodic Table.

It will be apparent to those skilled in the art, that variations in, e.g., gel strength and solubility, can be expected, depending on the specific sequestrant used, the type and amount of ions present in the water, and the type and amount of ions used as gelling agent. In many cases, the practitioner will be limited by local conditions; e.g., the composition of local tap water.

Also, the particular end use will dictate the optimum gel strength or mode of gelation desired. It is considered within the skill of the art for the practitioner to vary the type and amounts of reagents, as taught herein, to overcome particular problems or achieve desired end products.

Partially deacetylated gellan gums are produced under conditions such that the degree of deacetylation ranges from less than 100% to greater than 0%. The degree of deacetylation can be controlled by varying conditions such as temperature (25°–85° C.), the amount of caustic (pH>7.0), and the reaction time. Deacetylation can be achieved during the fermentation process, i.e., by fermenting under alkaline conditions.

The invention is further defined by reference to the following examples, which are intended to be illustrative and not limiting.

EXAMPLE 1

Dissolution of Gellan Gum in the Presence of Mono- and Divalent Cations

The data of Table 1-1 demonstrate the various effects obtained by the use of different types and amounts of reagents. The indicated amounts of sequestrant and gellan gum (0.5% wt./vol.) were added to STW and stirred for 2 hours at room temperature. (STW refers to synthetic tap water which comprises 1000 ppm NaCl and 143 ppm $CaCl_2.2H_2O$ dissolved in D.I. water.)

TABLE 1-1

Use of Sequestrants in STW
(0.5% Wt./Vol. Deacetylated Gellan Gum)

| Sequestrant | Concentration (% wt./vol.) | Viscosity (cP)[1] |
|---|---|---|
| Calgon | 0.25 | 385 |
|  | 0.5 | 305 |
|  | 1.0 | 6 (Insoluble)[2] |
| Na Citrate | 0.25 | 355 |
|  | 0.5 | 12 (Insoluble) |
|  | 1.0 | 5 (Insoluble) |
| TSPP | 0.25 | 340 |
|  | 0.5 | 7 (Insoluble) |
|  | 1.0 | 4 (Insoluble) |
| EDTA (Disodium Salt) | 0.25 | 5 (Insoluble) |
|  | 0.5 | 4 (Insoluble) |
|  | 1.0 | 4 (Insoluble) |
| TSP | 0.25 | 410 |
|  | 0.5 | 365 |
|  | 1.0 | 6 (Insoluble) |
| Control (No Sequestrant) | 0 | 0 (Insoluble) |

[1]Brookfield LVF, 60 rpm, appropriate spindle.
[2]Sequestrants salt out gellan gum at high concentrations.

EXAMPLE 2

Use of Sequestrant in Milk (0.5% wt./vol. Gellan Gum; 0.5% wt./vol. TSPP)

To demonstrate the effect of TSPP in the hydration of gellan gum in milk, 0.5% gellan gums (native and deacetylated) were added with mixing to milk containing 0.5% TSPP. The native gellan gum exhibited a significant increase in viscosity when compared to a control containing no gellan gum.

TABLE 2-1

Hydration of Gellan Gums in Milk/TSPP

| Gum | Viscosity* (cP) |
|---|---|
| Native | 305 |
| Deacetylated | 83 |
| Control | 75 |

*Brookfield LVF, 60 rpm, appropriate spindle.

EXAMPLE 3

Cold Milk Gels

To the hydrated gellan gum/milk compositions of Example 2 were added 0.54% $CaSO_4$. These compositions were then allowed to set for 24 hours. The gel strengths of Table 3-1 were obtained.

TABLE 3-1

Cold Milk Gels

| Gum | Gel Strength* (gm/cm$^2$) |
|---|---|
| Native | 24 |
| Deacetylated | 5 |
| Control | 9 |

*Marine Colloids GT-3 (small head plunger).

EXAMPLE 4

Bulk Setting

Dry blends of deacetylated gellan gum/sequestrant (Calgon)/various calcium salts were prepared as self-gelling blends and their gel strengths (in STW) were determined using Marine Colloids Gel Tester Model GT-3 with a small head plunger. Detailed results are shown in Table 4-1.

TABLE 4-1

Self-gelling Blends in STW
(Deacetylated Gellan Gum, 0.5% wt./wt.; Calgon, 0.08% wt./wt.)

| Concentration of Salt in Gel (% wt./wt.) | Blend Wt. (gm) | Blend Comp. (wt:wt:wt) (Salt:Gum:Seq.) | Gel Strength (gm/cm$^2$) | |
|---|---|---|---|---|
| CaSO$_4$ | | | (20 min. stirring) | |
| 0.1% | 0.68 | 15:73:12 | 23 | |
| 0.21% | 0.79 | 27:63:10 | 34 | |
| 0.31% | 0.89 | 35:56:9 | 34 | |
| 0.41% | 0.99 | 41:51:8 | 34 | |
| 0.51% | 1.09 | 47:46:7 | 27 | |
| | | | (20 min. Stir) | (40 min. Stir) |
| Ca Citrate | | | | |
| 0.14% | 0.72 | 19:70:11 | 21 | 23 |
| 0.29% | 0.87 | 33:58:9 | 34 | 36 |
| 0.43% | 1.01 | 42:50:8 | 32 | 38 |
| 0.57% | 1.15 | 50:43:7 | 34 | 47 |
| 0.72% | 1.30 | 55:39:6 | 42 | 44 |
| Ca Tartrate | | | (20 min. Stir) | |
| 0.20% | 0.78 | 26:64:10 | 40 | |
| 0.39% | 0.97 | 40:52:8 | 36 | |
| 0.59% | 1.17 | 50:43:7 | 25 | |
| 0.78% | 1.36 | 57:37:6 | 19 | |
| 0.98% | 1.56 | 63:32:5 | 17 | |

EXAMPLE 5

Fabricated Apricot (Internal or Bulk Setting)

| Ingredients: | Percent (wt./wt.) |
|---|---|
| A. Fruit Mix | |
| Apricot halves, pureed | 35.00 |
| Sucrose, refined granular | 10.00 |
| Deionized water | 4.95 |
| Calcium sulfate, anhydrous | 0.05 |
| | 50.00 |
| B. Gellan Gum Mix | |
| Deionized water | 38.80 |
| Sucrose, refined granular | 10.00 |
| Deacetylated gellan gum | 1.00 |
| Sodium hexametaphosphate | 0.20 |
| | 50.00 |

The dry ingredients in Part B were thoroughly mixed by shaking in a bag and added to the deionized water with mixing, using a propeller type mixer. Mixing was continued for 10 minutes and the mix set aside.

The water from Part A was mixed with the puree, and a blend of the dry ingredients in Part A added with mixing for 45 seconds.

Parts A and B were combined with vigorous mixing with a wire whip for 20 seconds. The final mix was then allowed to stand under shear-free conditions at room temperature until set.

The gelled product was cut into dice shaped fruit pieces.

EXAMPLE 6

Pimiento Strip (Diffusion Setting) (Blend of Gellan Gums)

| Ingredients: | Percent (wt./wt.) |
|---|---|
| Deionized Water | 81.4 |
| Pimiento puree (CVC) | 16.9 |
| Guar gum (fine mesh) | 0.6 |
| Native gellan gum | 0.6 |
| Deacetylated gellan gum | 0.4 |
| Potassium sorbate | 0.1 |
|  | 100.0 |
| Aging Bath Ingredients: | |
| Tap water | 80.0 |
| Sodium chloride | 16.0 |
| Lactic acid | 2.0 |
| Calcium chloride | 2.0 |
|  | 100.0 |

A blend of the guar gum and gellan gums was slowly added to the water with mechanical agitation, and stirring continued for 45 minutes. The gum slurry was then added to the pimiento puree containing the potassium sorbate with mixing until a uniform paste was obtained.

The paste was poured into molds and allowed to settle until a level surface was obtained. A small quantity of aging bath solution, prepared by dissolving a blend of calcium chloride, sodium chloride and lactic acid in water, was poured over the surface of the paste. Gelation of the paste began immediately. After about 10 minutes, sufficient ions had diffused from the bath solution into the paste to form a gelled outer skin, which was strong enough to allow the paste to be transferred into the aging bath.

After 24 hours, the pimiento paste was removed from the aging bath. The paste, which had gelled completely, was cut into strips suitable for stuffing into olives. The strips were superior to control strips made with algin.

EXAMPLE 7

Cold Water Dessert Gel (Controlled Setting with a Dry Mix)

| Ingredients: | Percent (wt./wt.) |
|---|---|
| Deionized water | 86.171 |
| Sugar | 12.930 |
| Deacetylated gellan gum | 0.510 |
| Sodium alginate, KELTONE ® | 0.172 |
| Dicalcium phosphate, anhydrous | 0.090 |
| Fumaric acid (80 mesh) (Pfizer) | 0.057 |
| Sodium citrate, dihydrate (Pfizer) | 0.035 |
| Strawberry flavor (Firmenich 59.389/AP 05.51) | 0.028 |
| FD & C Red #40 | 0.007 |
|  | 100.000% |

A blend of the dry ingredients, sieved through a fine mesh screen, was added to the water with vigorous mixing for 30-45 seconds using a wire whisk. The solution was poured into serving dishes and, after approximately 6 minutes at room temperature, set up to a pleasing dessert gel.

EXAMPLE 8

Extrusion Into Salt Solution

One percent solutions of various forms of gellan gum (native, deacetylated and deacetylated clarified) in D.I. water were injected into a 10% (wt./wt.) calcium chloride solution. Firm, string-like gels were produced.

TABLE 8-1

| | Extrusion Process | |
|---|---|---|
| Gum | 1% D.I. $H_2O$ Viscosity (cP) | Gel Characteristics in 10% $CaCl_2$ |
| Native gellan | 6470 | Firm white, opaque "worm-like" gel |
| Deacetylated gellan | 1290 | Firm white, opaque "worm-like" gel |
| Deacetylated Clarified gellan | 2750 | Firm colorless, clear, "worm-like" gel |

EXAMPLE 9

Partially Deacetylated Gellan Gum Gels

Native gellan gum fermentation liquor was reacted for 3 hours at 40° C. with 1M $NH_4OH$ to achieve 50% deacetylation of the gellan gum (method of Hestrin, *J. Biochem.*, 180, 249-261 (1949), using acetylcholine chloride as the standard).

50 Percent deacetylated gellan gum (1.5% wt./vol.) was hydrated in DI water and then 1% NaCl was added. This produced a gel with a gel strength was 15 g/cm$^2$ (Marine Colloids GT-3, small head plunger).

50 Percent deacetylated gellan gum (1.5% wt./vol.), Calgon (0.08%) and $CaSO_4$ (0.31% wt./wt.) were stirred in STW for 20 minutes. A gel was formed having a gel strength of 42 g/cm$^2$.

50 Percent deacetylated gellan gum (0.5% wt./vol.) was added with mixing to milk containing 0.5% TSPP and the viscosity compared to a control containing no gellan gum. To these compositions was added 0.54% $CaSO_4$, and the compositions were allowed to set for 24 hours. The data of Table 9-1 were obtained.

TABLE 9-1

Partially Deacetylated Gellan Gum Gels

| Sample | Viscosity (cP) | Gel Strength (gm/cm$^2$)* |
|---|---|---|
| 50% Deacetylated | 325 | 178 |
| Control | 120 | 17 |

*Marine Colloids GT-3 (small head-plunger)

EXAMPLE 10

Mild pH Partial Deacetylation

Gellan gum fermentation liquor was reacted with 0.25×KOH and 0.5×KOH* at 85° C. Samples were taken at 2-3 minute intervals and the degree of deacetylation and gel strengths were determined. The data of Table 10-1 were obtained.

*1.0×KOH represents the amount of KOH calculated to fully deacetylate all the native gum, as determined by IPA precipitation, in a batch of fermentation liquor, assuming the gum to have a 4% acetyl content.

Gels were prepared by addition of 0.55 g of gellan gums to 100 g of deionized water containing 750 ppm of $MgCl_2.6H_2O$, autoclaving 15 minutes at 250° F., cooling the mixture and standing 4 hours at room temperature.

TABLE 10-1

| | Mild pH Partial Deacetylation | | |
|---|---|---|---|
| Time (min.) | Acetyl (%) | Deacetyl. (%) | Gel Strength[1] (gm/cm$^2$) |
| 0 | 3.67 | 0 | 0 |
| 0.25 × KOH | | | |
| 5 | 1.94 | 47 | 190 |
| 8 | 1.54 | 58 | 148 |
| 10 | 1.43 | 61 | 230 |
| 12 | 1.88 | 49 | 243 |
| 15 | 1.71 | 53 | 243 |
| 0.5 × KOH | | | |
| 2 | 0.45 | 88 | 328 |
| 5 | 0.23 | 94 | — |
| 8 | 0.21 | 94 | 412 |
| 10 | 0.14 | 96 | — |
| 12 | 0.13 | 97 | — |
| 15 | 0.16 | 96 | 391 |

[1]Marine Colloids Gel Tester (GT-3) using small head plunger. This equipment was also used in Example 11.

EXAMPLE 11

Variable pH Partial Deacetylation

Gellan gums fermentation liquors were reacted at 85° C. for 5 minutes with various amounts of KOH. The data of Table 11-1 were obtained.

TABLE 11-1

| | Variable pH Partial Deacetylation | | |
|---|---|---|---|
| × KOH | Initial pH | Acetyl (%) | Deacetyl. (%) | Gel Strength[1] (gm/cm$^2$) |
| 0 | — | 5.1 | 0 | — |
| 0.075 | 8.4 | 4.3 | 16 | — |
| 0.10 | 8.5 | 3.2 | 37 | 15 |
| 0.15 | 8.2 | 3.3 | 35 | 17 |

TABLE 11-1-continued

| | Variable pH Partial Deacetylation | | |
|---|---|---|---|
| × KOH | Initial pH | Acetyl (%) | Deacetyl. (%) | Gel Strength[1] (gm/cm$^2$) |
| 0.20 | 8.8 | 2.8 | 45 | 57 |
| 0.25 | 9.2 | 2.9 | 43 | 42 |
| 0.30 | 9.4 | 2.5 | 51 | 66 |
| 0.35 | 9.5 | 2.2 | 57 | 89 |
| 0.40 | 10.0 | 2.2 | 57 | 114 |
| 0.45 | 10.4 | 1.5 | 71 | 159 |

[1]Gels were prepared and gel strengths determined as in Example 10.

What is claimed is:

1. A gelled food product comprising a matrix having one or more food ingredients dispersed therein, said food ingredients being selected from the group consisting of vegetable, fruit, meat, fish, sugar, milk, and mixtures thereof wherein said food product is prepared by:
   (a) forming an aqueous slurry of the food ingredients and 0.05-3% (wt./wt.) gellan gum at 0°-70° C., and
   (b) adding to said slurry an effective amount of free cations selected from $H^+$, $Li^+$, $Na^+$, $K^+$, $Rb^+$, $Cr^+$, $Fr^+$, $Be^{++}$, $Mg^{++}$, $Ca^{++}$, $Sr^{++}$, $Ba^{++}$, $Ra^{++}$, $B^{+++}$, $Al^{+++}$, $Ga^{+++}$, $In^{+++}$, or $Tl^{+++}$ at 0° C.-70° C.

2. A gelled food product of claim 1 wherein the free cations are $H^+$, $Na^+$, $K^+$, $Ca^{++}$, $Mg^{++}$, or $Al^{+++}$.

3. A gelled food product of claim 1 wherein the gellan gum is native, partially deacetylated, or partially deacetylated clarified.

4. A gelled food product of claim 1 wherein the aqueous composition of step (a) comprises one or more cations selected from $H^+$, $Li^+$, $Na^+$, $K^+$, $Rb^+$ $Cs^+$, $Fr^+$, $Be^{++}$, $Mg^{++}$, $Ca^{++}$, $Sr^{++}$, $Ba^{++}$, $Ra^{++}$, $B^{+++}$, $Al^{+++}$, $Ga^{+++}$, $In^{+++}$, or $Tl^{+++}$ and a sufficient amount of sequestrant to dissolve the gellan gum.

5. A gelled food product of claim 4 wherein said sequestrant is trisodium orthophosphate, ethylenediaminetetraacetic acid, sodium citrate, tetrasodium pyrophosphate or sodium hexametaphosphate.

* * * * *